United States Patent [19]
Kruh

[11] Patent Number: 5,481,248
[45] Date of Patent: Jan. 2, 1996

[54] OVERHEAD CRANES HAVING COLLISION AVOIDANCE CAPABILITIES

[76] Inventor: Brian A. Kruh, 11917 SE. 169th Pl., Renton, Wash. 98058

[21] Appl. No.: 29,683

[22] Filed: Mar. 11, 1993

[51] Int. Cl.$^6$ .................................................. G08B 21/00
[52] U.S. Cl. ............................................ 340/685; 340/436
[58] Field of Search ................................. 340/685, 436; 367/909; 212/159

[56] References Cited

U.S. PATENT DOCUMENTS

| | | |
|---|---|---|
| 2,708,715 | 5/1955 | Meyers . |
| 3,370,166 | 2/1968 | Rold et al. . |
| 3,716,822 | 2/1973 | Tsuruta .................................. 340/1 R |
| 3,806,861 | 4/1974 | Okumura et al. ....................... 340/1 R |
| 4,030,088 | 6/1977 | McCullough ........................... 212/151 |
| 4,286,911 | 9/1981 | Benjamin ................................ 414/273 |
| 4,551,722 | 11/1985 | Tsuda et al. ............................ 367/909 |
| 4,644,237 | 2/1987 | Frushour et al. ....................... 367/909 |

*Primary Examiner*—Edward L. Coles, Sr.
*Assistant Examiner*—Thomas L. Stoll
*Attorney, Agent, or Firm*—Hughes, Multer & Schacht

[57] ABSTRACT

An apparatus controlling an overhead crane in a manner that reduces the likelihood that the crane and objects suspended therefrom will contact another object. This apparatus comprises a standard control panel for controlling the speed and direction of the crane based on a plurality of operator control signals and a collision avoidance system. The collision avoidance system comprises (a) an ultrasonic transceiver for generating an ultrasonic signal and receiving a reflected ultrasonic signal that has been reflected off of the other object, the reflected ultrasonic signal being indicative of a distance between the crane and the other object; (b) means for generating an analog ranging signal based on the reflected ultrasonic signal, the level of the ranging signal being substantially proportional to the distance between the crane and the other object; (c) a plurality of relays; and (b) relay driver means associated with each of the relays for operating the relay associated therewith, the relay driver means being operator adjustable to allow the relays associated therewith to be operated based on a desired level of the ranging signal. The relays are so arranged and the relay driver means are so adjusted that, when the crane is likely to contact the other object, the relay driver means so operates the relays that the relays cause the control means initially to limit the speed of crane and then to stop the crane. With switches controlled based on a direction of travel of the crane, more than one ultrasonic transceiver may be employed.

15 Claims, 13 Drawing Sheets

OVERHEAD CRANES HAVING COLLISION AVOIDANCE CAPABILITIES

TECHNICAL FIELD

The present invention relates to overhead cranes and, more particularly, to overhead cranes that have collision avoidance systems that reduce the likelihood of collisions with other objects.

BACKGROUND OF THE INVENTION

Overhead cranes for transporting heavy items from one location to another within a designated area are well-known in the art. Such cranes basically comprise: (a) a bridge spanning the distance between a pair of rails; (b) motorized end trucks mounted on each end of the bridge that engage the rails to move the bridge along the rails; (c) a motorized trolley mounted for movement along the bridge; (d) a motorized hoist mounted on the trolley for raising and lowering an object to be moved; (e) a pendant or radio control device that allows an operator to generate operator control signals; and (f) a crane control panel that controls the motors in the end trucks, the trolley, and the hoist according to the operator control signals. The operator can control these various motors to move the objected suspended by the hoist within a designated area defined between the rails.

In a number of situations, it is possible for the objects suspended by the hoist to collide with other objects. For example, more than one crane are often mounted on a given set of rails. Should these cranes be operating near each other with objects suspended therefrom, it is very possible that the objects suspended by the two cranes could contact each other. In other cases, at least one end of the rails may abut a wall. An object suspended from a crane operating near the wall may collide with the wall.

It would thus be highly desirable if cranes could be controlled in a manner that reduces the likelihood that the cranes or objects suspended therefrom will come into contact with other objects.

RELATED ART

The following U.S. patents were discovered as part of a professional patentability search conducted on behalf of the applicant: (a) Tsuda et al. U.S. Pat. No. 4,551,722 issued 5 Nov. 1985; (b) Okumura et al. U.S. Pat. No. 3,806,861 issued 23 Apr. 1974; (c) Tsuruta U.S. Pat. No. 3,716,822 issued 13 Feb. 1973; (d) Da Rold et al. U.S. Pat. No. 3,370,166 issued 20 Feb. 1968; and (e) Meyers et al. U.S. Pat. No. 2,708,715 issued 17 May 1955. In addition, the Applicant is aware of the following other publications: (a) a manual for an Ultrasonic Ranging System sold by Polaroid Corporation (the Polaroid reference); (b) a manual for a SONICTRAC Sonic Measuring Unit sold by Carotron (the SONICTRAC reference); and (d) a manual for an Electronic Relay Card sold by Carotron the (the Carotron reference).

The concept of using ultrasonic waves to determine the distance between one object and another object is generally shown in the Tsuda, Okumura, Tsuruta, and Da Rold patents and the Polaroid, SONICTRAC, and Carotron references. The Tsuda, Okumura, Tsuruta, and Da Rold patents generally employ the distance information obtained from an ultrasonic ranging system to avoid collisions between two objects. None of these references disclose the use of ultrasonic ranging systems in the field of overhead cranes.

The Meyers patent relates to collision prevention systems for overhead cranes but does not employ an ultrasonic transducer. Instead, the Meyers patent discloses a beam so projected from one crane towards another crane that the beam is received by a photo-electric cell only when the two cranes are a minimum safe distance apart. Therefore, once the cranes are the minimum safe distances apart, a signal generated by the photo-electric cell stops the crane. After the cranes have been stopped, the system allows the cranes to be operated at reduced speeds. Such photo-electric systems are unreliable because they are highly susceptible to the dirt and dust present in many factory settings.

OBJECTS OF THE INVENTION

In view of the foregoing, it is apparent that an important object of the present invention is to provide improved apparatus and methods for controlling overhead cranes.

Another important, but more specific, object of the present invention is to provide such apparatus and methods having a favorable mix of the following factors:

a. reliable in a factory environment;

b. controls the crane in a manner that reduces the likelihood of collisions;

c. does not cause a crane to stop as it is moving at high speeds;

d. can be inexpensively implemented with standard crane control panels currently in use;

e. can be configured to work to look in either direction of travel of the crane; and f. is adaptable to work with a wide variety of configurations of crane control panels.

SUMMARY OF THE INVENTION

These and other objects are achieved by the present invention, which is an overhead crane having collision control system the reduces the likelihood that the crane and objects suspended from the crane will contact other objects. The collision control system employs an unltrasonic transceiver to obtain an analog ranging signal the level of which corresponds to the distance between the crane and an object in its direction of travel. A plurality of user adjustable relay driver circuits, each having an associated relay, are provided to operate the relays to control the crane control panel to limit the speed of the crane based on the analog ranging signal. In one configuration, the relays are arranged initially to slow down the crane and then to stop the crane.

This system operates with standard crane control panels connected in a number of standard configurations. In operation, the present system gradually slows the crane by progressively limiting the maximum speed of the crane when it nears another object and does not abruptly stop the crane as it is traveling at high speeds. Further, because it does not rely on optical sensors, it is not as susceptable to problems caused by the harsh environment found in many factories.

In another exemplary configuration, the collision control system is provided with two ultrasonic transceivers facing in different directions and switches for choosing signals generated by the ultrasonic transceivers based on the direction of travel of the crane. Thus, a large part of the circuitry provided for a system employing one transceiver can be used without modification to support two different transceivers.

DETAILED DESCRIPTION OF THE INVENTION

Figure 1:
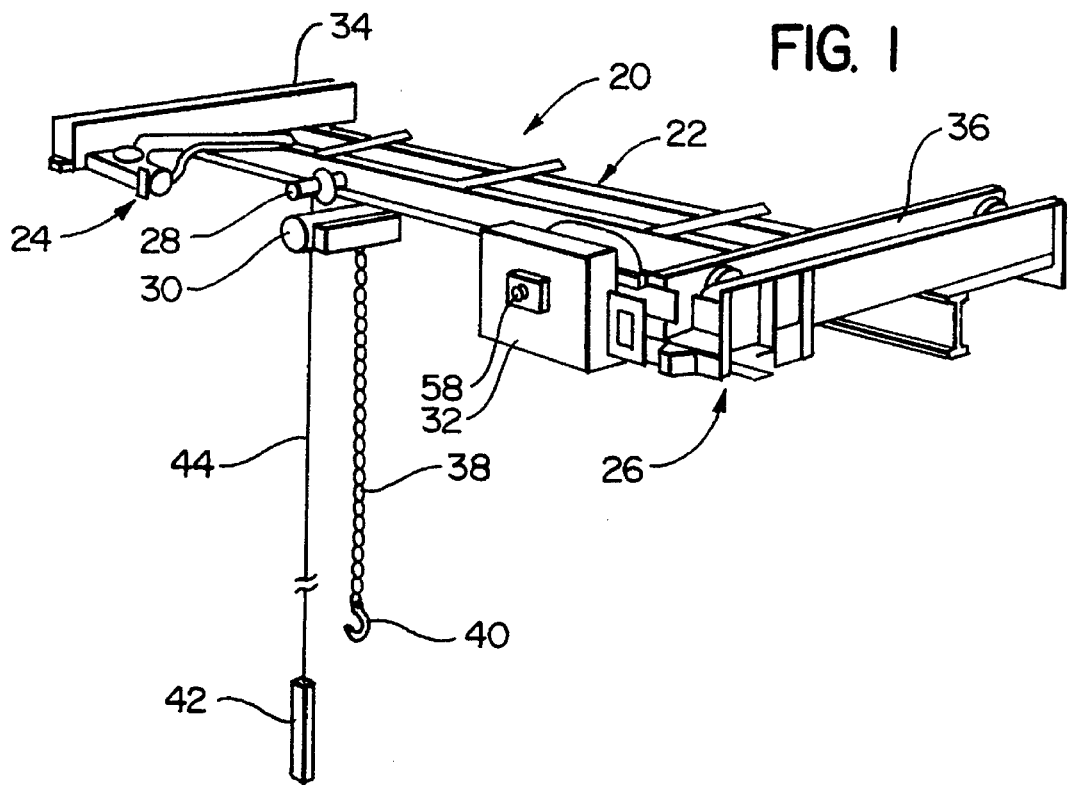
FIG. 1 is a perspective view depicting the major components of a crane controlled by a collision avoidance system of the present invention.

Referring initially to FIG. 1 of the drawing, that figure pictorially depicts an overhead crane 20 that is exemplary of one type of crane that would be controlled by a collision avoidance system constructed in accordance with the present invention. The crane 20 itself is well-known and thus will be described herein only to the extent necessary for a complete understanding of the present invention.

The crane 20 basically comprises a bridge 22, end trucks 24 and 26, a trolley 28, a hoist 30, and a control panel housing 32. The end trucks 24 and 26 support the bridge 22 on rails 34 and 36. The trolley 28 supports the hoist 30 on the bridge 22. The end trucks 24 and 26 are motorized to allow the bridge 22 to move along the rails 34 and 36; the trolley 28 is also motorized to displace the trolley 28 along the bridge 22. The hoist 30 is secured to the trolley 28 and motorized to displace a chain 38 to move a hook 40 up and down.

A pendant control 42 is connected through cabling 44 to a crane control panel (not shown in FIGS. 1 and 2, discussed below) in the control panel housing 32. The operator uses the pendant control 42 to generate operator control signals which direct the crane control panel in the control panel unit 32 to control various motors to displace the bridge 22, trolley 28, and hook 40 as necessary to engage an object at one location and transport the object to another location.

Figure 2:
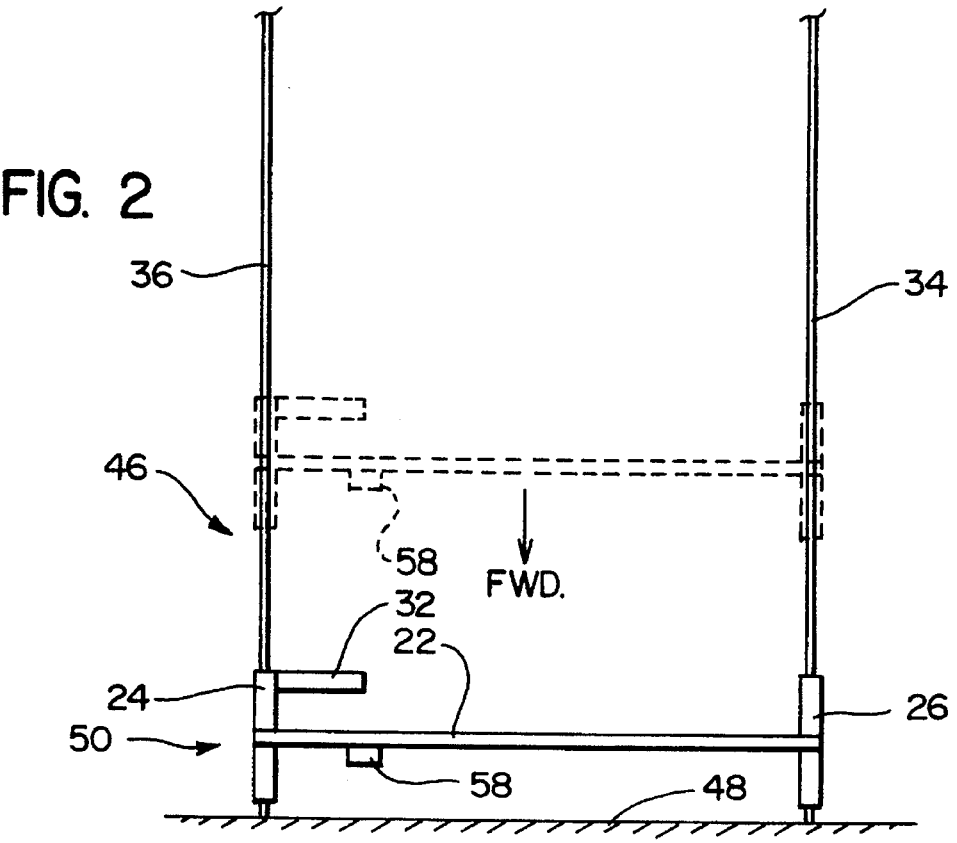
FIG. 2 schematically depicts an overhead material handling system having a crane such as that depicted in FIG. 1 and a collision avoidance system of the present invention.

Referring now to FIG. 2, schematically depicted therein is an overhead material handling system 46 employing a crane, such as the crane 20, and rails 34 and 36 described above. The material handling system 46 is adjacent to a wall 48. The material handling system 46 presents the possibility that the crane 20 will collide with the wall 48.

The material handling system 46 further comprises an exemplary collision avoidance system generally depicted at 50 in FIG. 2 that is constructed in accordance with, and embodies, the principles of the present invention.

Figure 3:
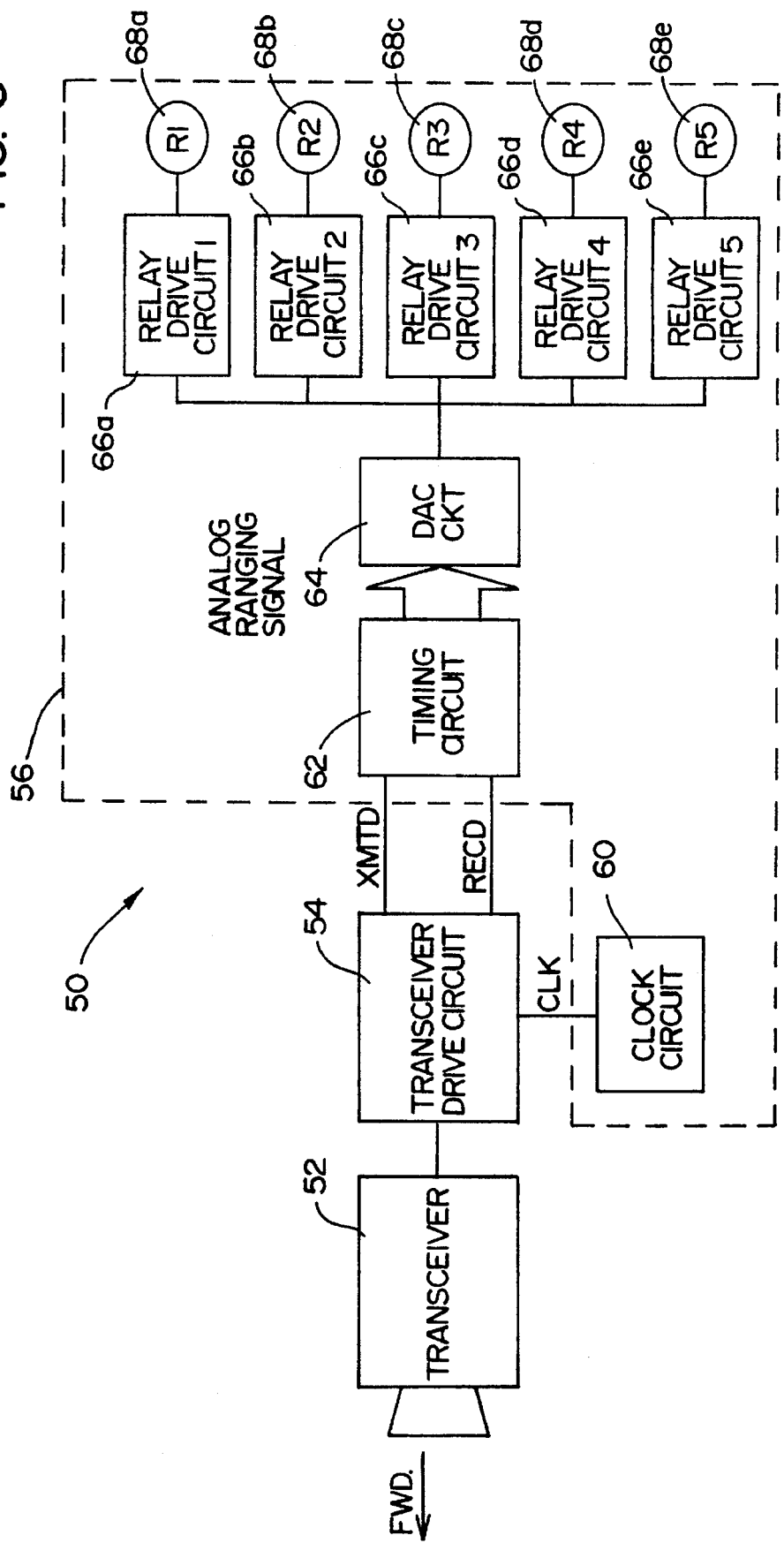
FIG. 3 is block diagram of a exemplary collision avoidance system for use in the system shown in overhead material handling system of FIG. 2, the collision avoidance system of FIG. 3 being constructed in accordance with, and embodying, the principles of the present invention.

As perhaps best depicted in FIG. 3, the collision avoidance system 50 comprises a tranceiver 52, a transceiver drive circuit 54, and a control circuit 56. Referring for a moment back to FIG. 2, the control circuit 56 is mounted in the control panel housing 32, and the transceiver 52 and transceiver drive circuit 54 are contained in a transceiver housing 58. The transceiver housing 58 may be mounted on the control panel housing 32 as shown in FIG. 1 or on the bridge 22 as shown in FIG. 2. In the situation shown in FIG. 2, the transciever 54 is mounted on the bridge 22 and directed towards the wall 48 in what will be referred to in connection with FIGS. 2–7 as the forward direction.

Figure 4:
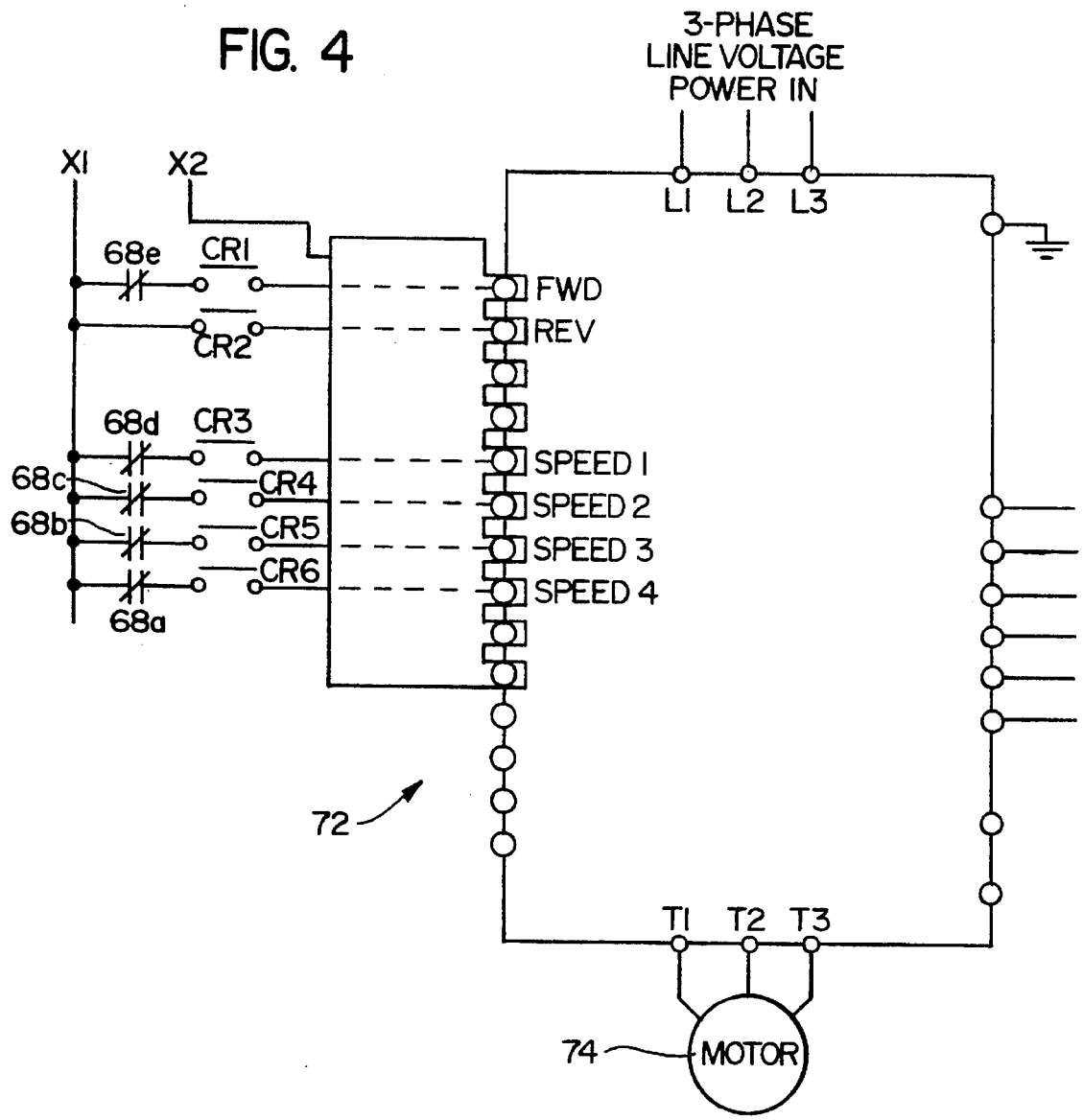
FIG. 4 depicts an exemplary control panel for an end truck drive motor and one configuration of switch logic therefor for use with the system depicted in FIG. 2.

Referring back to FIG. 3, it can be seen that the exemplary control circuit 56 basically comprises a clock circuit 60, a timing circuit 62, a digital to analog converter (DAC) circuit 64, a plurality of relay drive circuits 66a–e, and a plurality of relays R1–R5 having normally closed contacts 68a–e (FIG. 4).

The collision avoidance system 50 operates in the following basic manner. The clock circuit 60 generates a square wave clock signal (CLK) having a predetermined frequency. On each positive transistion of the CLK signal, the transceiver drive circuit 62 instructs the transceiver 52 to transmit a transmitted ultrasonic signal comprising a series of pulses and, at the same time, generates a transmitted (XMTD) signal. The timing circuit 62 begins counting when the XMTD signal is received thereby.

When another object such as the wall 48 (FIG. 2) is in the forward direction of travel of the crane 20, the transceiver 52 subsequently receives a reflected ultrasonic signal. In the situation depicted in FIG. 2, the reflected ultrasonic signal is a portion of the transmitted ultrasonic signal that is reflected off of the wall 48.

When the transceiver drive circuit 54 detects that the transceiver 52 has received the reflected ultrasonic signal, the transceiver drive circuit 54 generates a received (RECD) signal. The timer circuit 62 stops counting when it receives the RECD signal. The digital number reached by the timer circuit 62 is indicative of the time period between the generation of the XMTD and the RECD pulses; this time period is indicative of the distance between the crane 20 and the wall 48. Further, as the distance between the crane 20 and the wall 48 decreases, this number will decrease.

The binary number generated by the counting circuit 62 is converted to an analog ranging signal by the DAC circuit 64. The level of the analog ranging signal is also indicative of the distance between the crane 20 and the wall 48. In the exemplary collision avoidance system 50, the output of the DAC circuit 64 is so inverted that the maximum voltage level of the analog ranging signal corresponds to minimum distance between the crane 20 and the wall 48, while the minimum voltage level of the analog ranging signal corresponds to the maximum distance between the crane 20 and the wall 48.

The relay driver circuits 66a–e receive this analog ranging signal and may be operator adjusted to allow the relays R1–R5 associated therewith to be operated when the analog ranging signal reaches a desired level. The adjustment of the relay drive circuits 66a–e and arrangement of the normally closed contacts 68a–e of these relays R1–R5 will be discussed in more detail below.

Referring now to FIG. 4, depicted therein is an exemplary crane control panel 72 for controlling the speed and direction of travel of the bridge 22 of the crane 20. Three-phase line voltage enters the crane control panel 72 through terminals connected to power lines L1, L2, and L3. Terminals T1, T2, and T3 of the crane control panel 72 are connected to a three-phase motor 74, which represents the motors in the end trucks 24 and 26. An example of such a crane control panel is available on the market under the trademark IMPULSE,G+ from Electromotive Systems, Inc. of Milwaukee, Wis.

As is well-known in the art, the operator presses buttons (not shown) on the pendant control 42 to generate signals which close the normally open relays CR1–CR6 depicted therein. Specifically, pressing a FORWARD button on the pendant control 42 closes relay CR1, while pressing a REVERSE button on the pendant control 42 closes relay CR2. When these relays CR1 or CR2 are closed, the crane control panel 72 energizes the motor 74 in a manner that causes the bridge 22 to move forward or reverse, respectively, at a low speed.

The operator can alter the speed of the bridge 22 by pressing buttons on the pendant control 42 which close relays CR3, CR4, CR5, and CR6. Normally, closing CR3 yields a speed greater than that achieved by closing only CR1 or CR2, closing CR4 yields a speed greater than that achieved by closing relay CR3, closing CR5 yields a speed greater than that achieved by closing relay CR4, and closing CR6 yields a speed greater than that achieved by closing relay CR5.

The above-discussed normally-open relays 68a–e of the collision avoidance system 50 are also depicted in FIG. 4. When energized, the contact 68a of the relay R1 is arranged to open and thus prevent the bridge 22 from traveling at the highest speed associated with the relay CR6. The contacts 68b–e of the relays R2–R4 are similarly arranged to prevent the bridge from traveling at the speeds associated with the relays CR5–CR3, respectively. When R5 is energized, the bridge 22 is effectively stopped because its normally closed contact 68e opens and current cannot flow through relay CR1, thereby preventing the crane 20 from moving in the forward direction. The contact 68e of the relay R5 is so arranged that the crane 20 can move in the reverse direction when contact 68e is opened, however.

With the contacts 68a–e of the relays R1–R5 arranged as described above with reference to FIG. 4, the relay driver circuits 66a–e may be adjusted to operate these relays R1–R5 as follows. Initially, the crane 20 will be placed a first distance (i.e. 35') away from the wall 48 and the relay driver circuit 66a is adjusted until the contact 68a of the relay R1 opens. Next, the crane 20 is placed a second distance (i.e. 25') away from the wall 48 and the relay driver circuit 66b adjusted until the contact 68b of the relay R2 opens. The same operation is performed for the contacts 68c–e of the relays R3–R5 for third, fourth, and fifth distances (i.e., 15', 10', and 5', respectively).

The collision avoidance system 50 will now be discussed in further detail. Of the basic components of the collision avoidance system 50, the transceiver 52 and transceiver drive circuit 54 are generally known and will not be discussed in detail herein. Similarly, the design and construction of a timing circuit 62 and the clock circuit 60 is well within the ability of one of ordinary skill in the art and need not be described herein in detail. The specific DAC circuit 64 employed herein is of interest and will be discussed at the end of this specification.

The first through fifth relay drive circuits 66a–e are identical, so only the drive circuit 66e will be described herein, with an understanding that the description of the circuit 66e applies to the circuits 66a–d as well.

Figure 5:
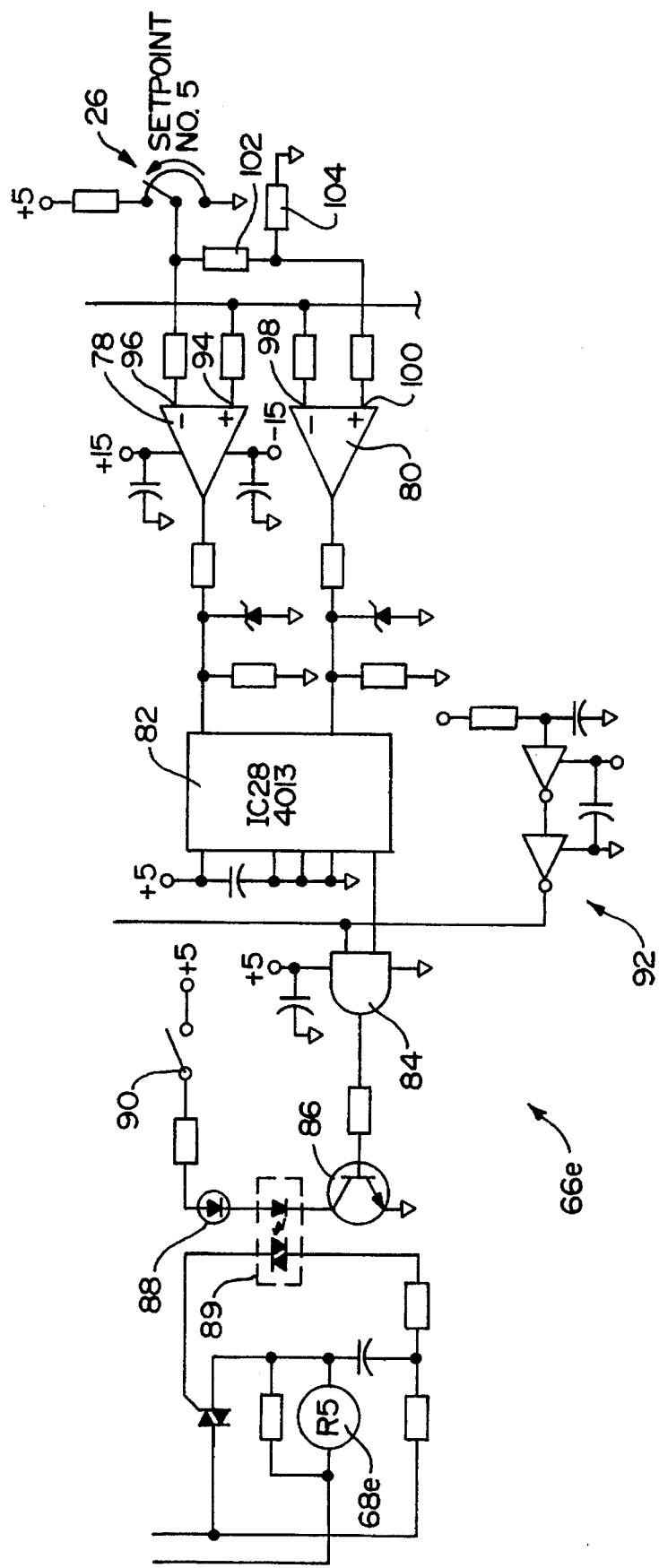
FIG. 5 depicts an exemplary relay drive circuit of the collision avoidance system of FIG. 3.

The relay drive circuit 66e depicted in FIG. 5 basically comprises a variable resister 76, first and second comparators 78 and 80, a flip flop 82, a delay AND gate 84, a drive transister 86, an LED 88, an opto-coupler 89, and a switch 90. The fifth relay 68e associated with the drive circuit 66e and a delay circuit 92 are also depicted in FIG. 5.

The relay drive circuit 66e operates basically as follows. Upon system turn on, the delay circuit 92 holds one input of the delay AND gate 84 LOW. This results in the output of the delay AND gate 84 being held LOW to prevent transient signals from energizing the relay R5 and opening the contact 68e thereof during system turn on. After the system has stabilized, the output of the delay circuit 92 goes HIGH to allow the output of the flip flop 82 to reach the transistor 86.

The output of the first comparator 78 goes high as the level of the signal at a positive input terminal 94 thereof falls below the level of the signal at a negative input terminal thereof 96. In this case, the analog ranging signal is present at the positive input terminal 94, while a first reference signal, which will be described in further detail below, is present at the negative input terminal 96.

Similarly, the output of the second comparator 80 goes high as the level of the signal at a negative input terminal 98 thereof falls below the level of the signal at a negative input terminal thereof 100. In this case, the analog ranging signal is present at the negative input terminal 98, while a second reference signal, which will also be described in further detail below, is present at the negative input terminal 100.

At this point, it should be reiterated that, in the exemplary collision avoidance system 50, the analog ranging signal is generated so that the level thereof is highest (e.g., 12 volts) when the transceiver 52 is immediately adjacent (e.g. 0.5') to the wall 48 or other object off of which the reflected ultrasonic signal is reflected and lowest (e.g., 0 volts) at the maximum range (e.g. 40') at which the transceiver 52 can receive the reflected ultrasonic signal.

The first and second reference levels are both set by the variable resistor 76. Specifically, an operator can manually adjust the first reference level between 0 and 12 volts using the variable resistor 76. The values of resistors 102 and 104 are chosen so that the level of the second reference level is a predetermined amount below the first reference level; the second reference level should normally be between 5% and 15% below the first reference level and, in the exemplary system 50, is approximately 11% below the first reference level.

When the output of the first comparator 78 goes HIGH, the output of the flip flop 82 is set HIGH and the output of the AND gate 84 goes HIGH, turning the transistor 86 ON. If the switch 90 is closed, when the transistor 86 turns ON, current flows through and illuminates the LED 88. At the same time, the fifth relay 68e is energized and opened through the opto-coupler 89.

When the output of the second comparator 80 goes HIGH, the output if the flip flop 82 goes LOW, turning the transistor 86 OFF. This prevents current from flowing through the LED 88 and the opto-coupler 89; the LED 88 is thus not illuminated, and the fifth relay 68e is deenergized and thus closed.

Referring back to the process of adjusting the various relay circuits 66a–e as described above, the analog ranging signal will be a different level for each of the distances (i.e., 35', 25', 15', 10', and 5') between the crane 20 and the wall 48. The variable resistor 76 of each of the relay driver circuits 66a–e is adjusted to set the reference levels so that the relay contacts 68a, 68b, 68c, 68d, and 68e open when the crane is distances of 35', 25', 15', 10', and 5', respectively, from the wall 48.

With the foregoing in mind, the operation of the above arrangement of relays R1–R5 relative to the crane control panel 72 can best be described with reference to the timing diagrams in FIGS. 6A and 6B. These timing diagrams depict the situation in which the crane 20 starts at a position 40' from the wall 48, moves forward to a position 5' from the wall 48, and then moves in reverse to a position 40' from the wall 48.

Figure 6A:
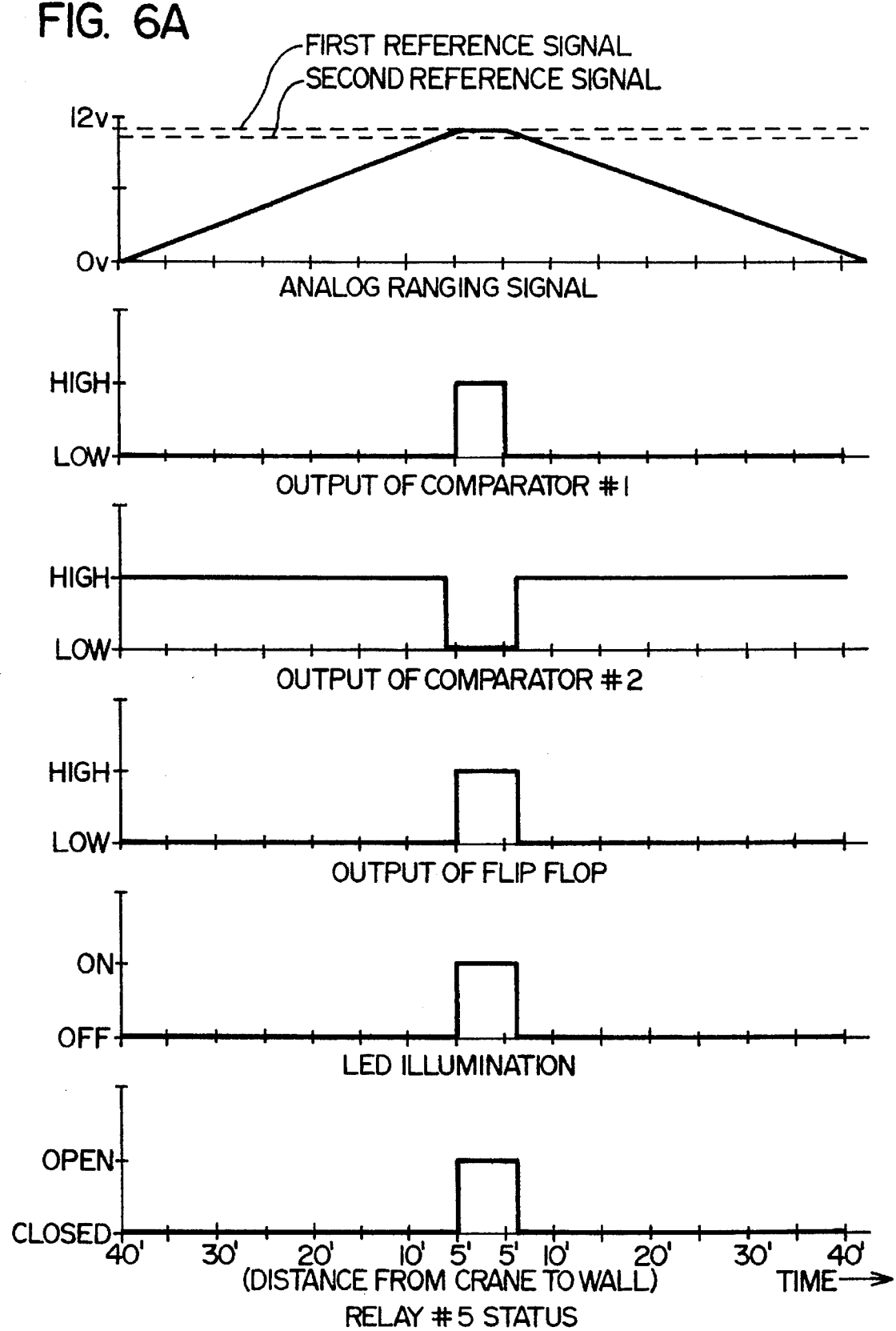
FIGS. 6A and 6B depict timing diagrams showing the state of certain components of the collision avoidance system depicted in FIG. 3 in one example of the operation thereof.

Referring initially to FIG. 6A, if the relay CR6 is closed and the crane 20 is operating at top speed in the forward direction and it comes within 35' of the wall 48, first comparator of the first relay drive circuit 66a goes HIGH, causing the output of flip flop of first relay drive circuit 66a also to go HIGH. When the output of this flip flop goes HIGH, the LED associated with the relay R1 is illuminated and relay contact 68a opens. This causes the crane 20 to move at the next slowest speed associated with relay CR5. As shown by the RELAY #5 STATUS segment of FIG. 5A, as long as the crane is moving forward and is within 35' of the wall 48, contact 68a is open, preventing the crane 20 from operating at its top speed.

In a similar manner, as the crane 20 continues to approach the wall 48, the contact 68b of the relay R2 is opened at 25' to limit the speed of the crane 20 to the speed associated with relay CR4, the contact 68c of the relay R3 is opened at 15' to limit the crane speed to the speed associated with relay CR3 at 15', and the contact 68d of the relay R2 is opened at 10' to limit the crane speed associated with relay CR1.

Figure 6B:
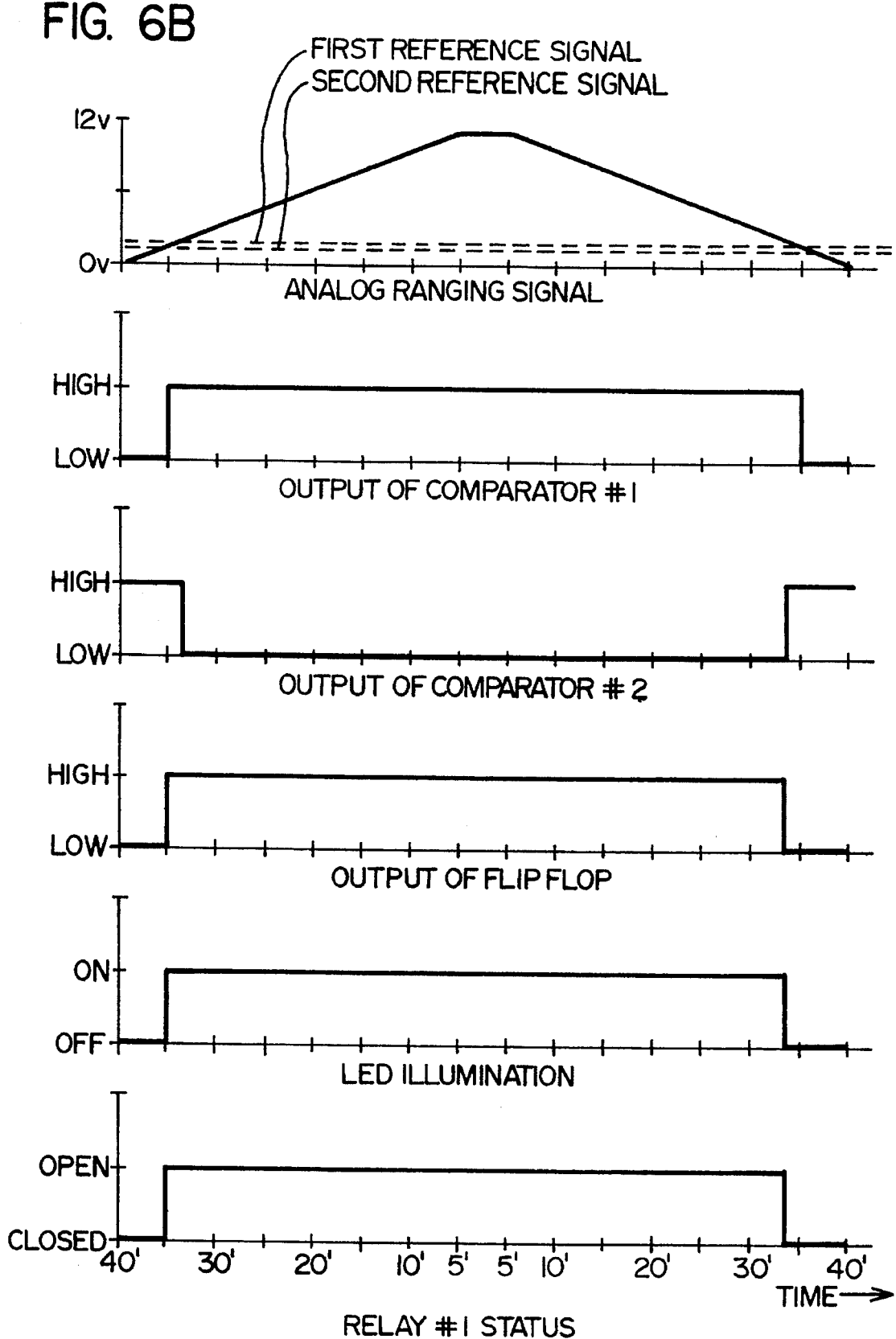

Referring now to FIG. 6B, as the crane 20 is still moving in the forward direction and it comes within 5' of the wall 48, the first comparator #1 of the fifth relay drive circuit 66e goes HIGH, causing the output of flip flop of relay R5 to go HIGH. As discussed above, when the output of this flip flop goes HIGH, the LED associated with the relay R5 is illuminated and the contact 68e of the relay R5 opens. The crane 20 is thereby prevented from moving further in the forward direction and colliding with the wall 48.

The result is that when the bridge 22 comes near the wall 48, the speed of the bridge 22 is initially limited, and the crane 20 is thus brought gradually rather than immediately to a stop. This is important because the object carried by the crane 20 may be heavy and/or delicate, and the gradual slow down before the stop will allow the object suspended from the crane to be gently decelerated.

The crane 20 can move at the slowest speed away from the wall 48 after the the contact 68e of the relay R5 has opened. As shown in FIG. 6B, the output of the second comparator of relay drive circuit 66e goes HIGH after the crane moves a short distance (corresponding the fixed relationship between the first and second reference signals). The crane 20 is thus again free to move either forward or reverse at its slowest speed.

This process is repeated for relays R4 through R2 as the crane 48 continues to move in the reverse direction away from the wall 48; when the crane 20 is a distance of between 25' and 35' from the wall 48, it can travel at the second fastest speed associated with the relay CR5. Then, as shown in FIG. 6A, the output of the second comparator of the first relay drive circuit 66a goes HIGH after the crane moves a short distance (again corresponding the fixed relationship between the first and second reference signals) beyond 35'. The crane 20 is thus again free to move either forward or reverse at its highest speed associated with relay CR6.

In the above-described example, the crane 22 was able to travel at five speeds by appropriate operation of the relays CR1–CR6. Accordingly, all five relays R1–R5 of the collision avoidance system 50 were employed to bring the crane 20 to a gradual stop. In some cases, the crane 20 may be capable of a different number of speeds. If fewer speeds are employed, not all of the relays R1–R5 need be used; those relays that are not used may be removed from the circuit by opening the switches 90 in the relay drive circuits associated with the unused relays. Of course, in the situation described above where all of the relays are used, all of the switches 90 are closed.

Figure 7:
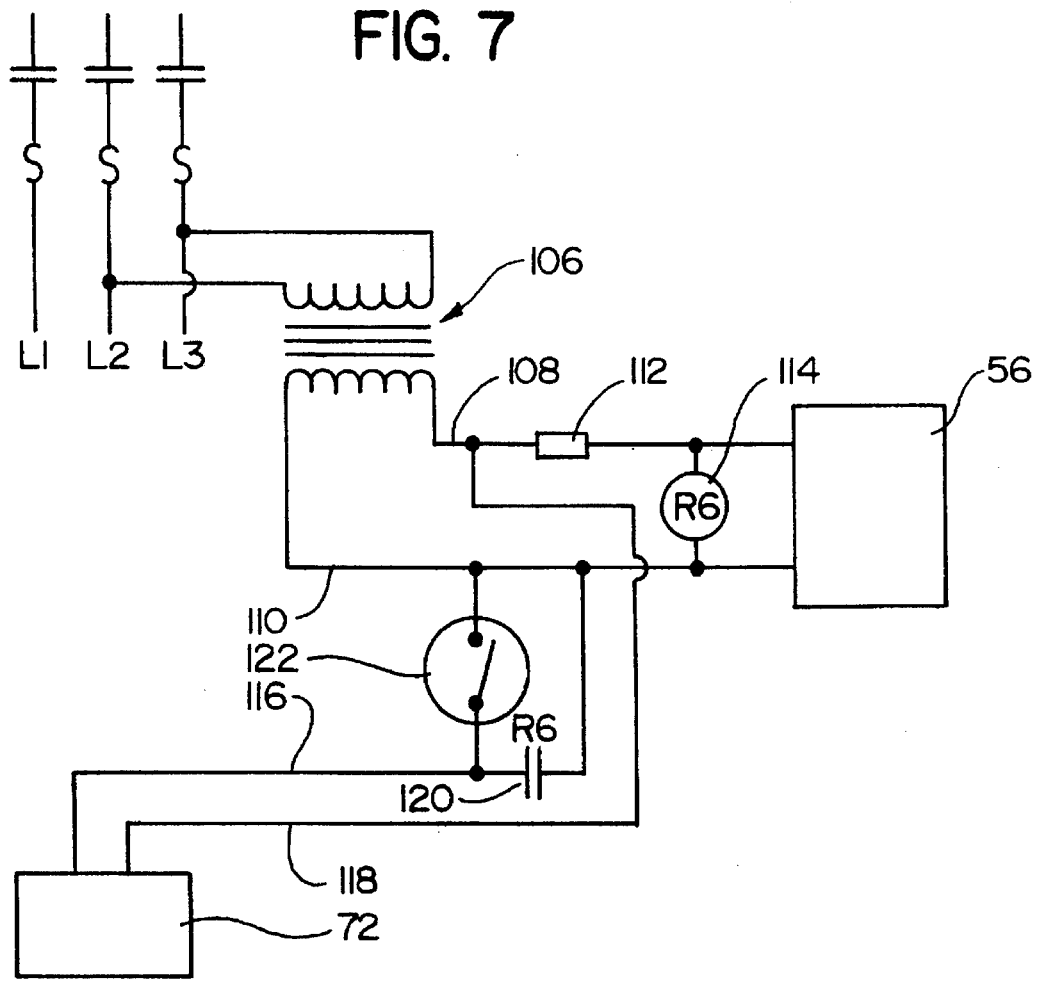
FIG. 7 is a block diagram of an interlock circuit for the collision avoidance system of FIG. 3.

Of interest is the means by which the control circuit 56 obtains its power. Referring now to FIG. 7, it can be seen that the control circuit 56 depicted therein obtains appropriate power from a transformer 106 connected to two of the three power lines L1, L2, and L3 from which the crane control panel 72 obtains power for driving the crane.

Specifically, first and second conductors 108 and 110 extend between the transformer 106 and the control circuit 56. A fuse 112 is placed in the first conductor 108. A relay R6 indicated at 114 is arranged between conductors 106 and 108. Third and fourth conductors 116 and 118 are arranged between the first and second conductors 108 and 110 and the control panel 72.

A normally open contact 120 of the relay R6 is so placed in the third conductor 116 that power reaches the crane control panel 72 only when power reaches the control circuit 56; that is, if the fuse 112 is blown by a fault in the control circuit 56 or crane control panel 72, the crane 20 will not operate.

A bypass switch 122 is provided between the second conductor 110 and the third conductor 116 to allow a user to bypass the contact 120 of the relay R6 to operate the crane 20 even when the collision avoidance panel 56 is inoperative.

Figure 8:
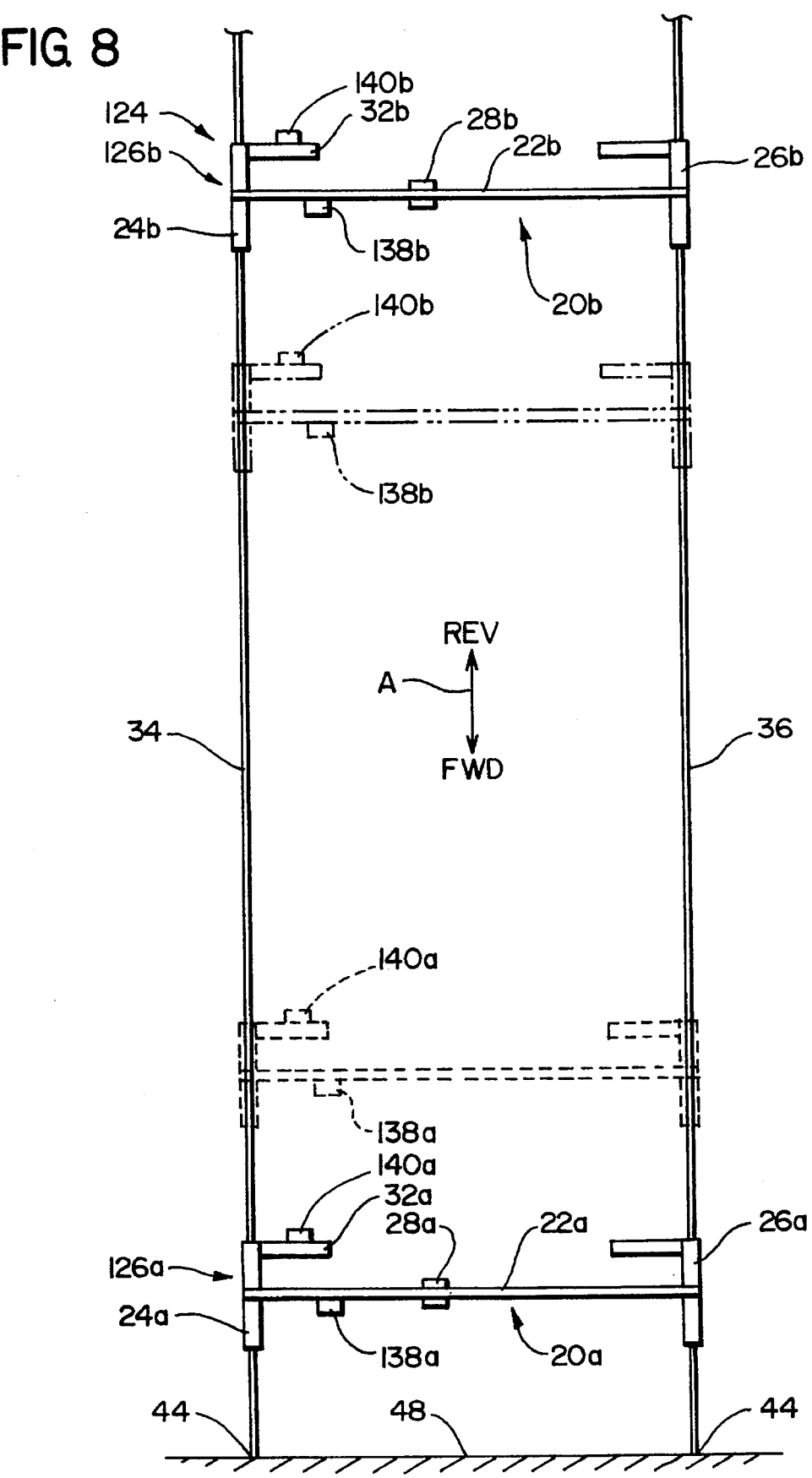
FIG. 8 schematically depicts another exemplary overhead material handling system having a crane such as that depicted in FIG. 1 and a collision avoidance system of the present invention.

Referring now to FIG. 8, an overhead material handling system 124 is depicted therein. This system 124 comprises first and second cranes 20a and 20b such as the crane 20 described above. These cranes 20a and 20b are mounted on the above-described rails 34 and 36; as before, a first end 44 of these rails 34 and 36 abuts the wall 48. The situation depicted in FIG. 9 is rather common and presents the possiblity that the cranes 20a and 20b will collide with each other, that the crane 20a will collide with the wall 46, that objects carried by the cranes 20a and 20b will collide with each other, or that an object carried by the crane 20a will collide with the wall 48.

Figure 9:
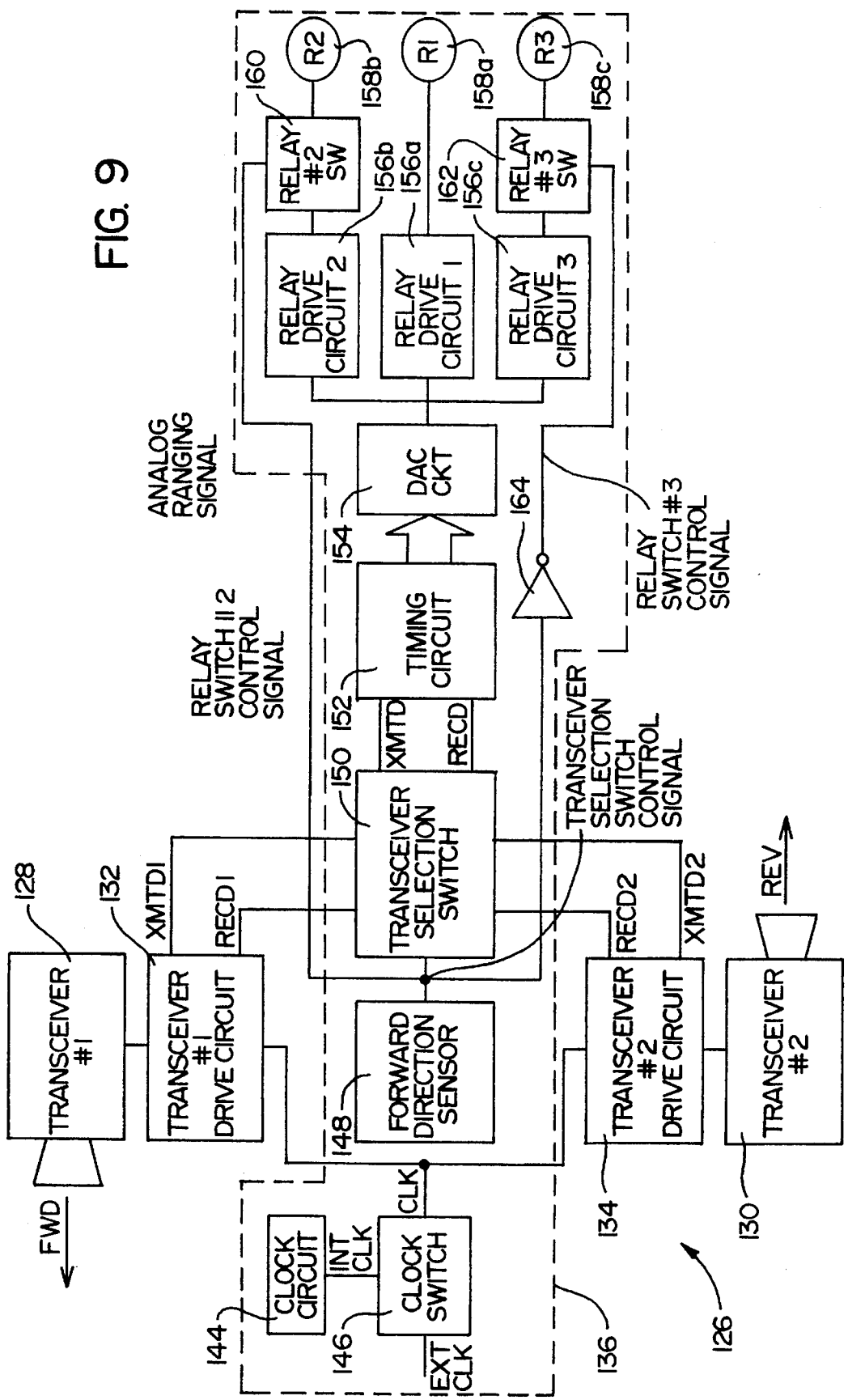
FIG. 9 is block diagram of an exemplary collision avoidance system for use in the system shown in overhead material handling system of FIG. 8, the collision avoidance system of FIG. 9 being constructed in accordance with, and embodying, the principles of the present invention.

Referring for a moment to FIG. 9, depicted at 126 therein is second exemplary collision avoidance system constructed in accordance with, and embodying, the principles of the present invention. This collision avoidance system 124 comprises first and second transceivers 126 and 128 arranged to transmit ultrasonic signals in forward and reverse directions directions, respectively from a crane. This collision avoidance system 124 can thus reduce the likelihood of collisions in two directions of travel.

Referring again to FIG. 8, generally depicted at 126a and 126b therein are first and second collision avoidance systems corresponding to the system 126 shown in FIG. 9. The first avoidance system 126a is mounted on the first crane 20a, and the second aviodance system 126b is mounted on the second crane 20b.

The collision avoidance systems 126a and 126b are identical in construction and operation. The system 126 shown in FIG. 9 will therefore be described, with an understanding that this description applies to the both of the collision avoidance systems 126a and 126b.

The collision avoidance system 126 comprises first and second transceivers 128 and 130, first and second transceiver drive circuits 132 and 134, and a dual direction control circuit 136.

Referring for a moment to FIG. 8, the control circuits of the collision avoidance systems 136a and 136b are mounted within the two control panel housings 32a and 32b, respectively. The first transceiver and first transceiver drive circuit of the collision avoidance system 136a are mounted within a first transceiver housing 138a, while the second transceiver and drive circuit therefore of this system 136a are mounted within a second transceiver housing 140a. Similarly, the first transceiver and transceiver drive circuit therefor of the collision avoidance system 136b are mounted with a third transceiver housing 138b, and the second transceiver and transceiver drive circuit therefor of the collision avoidance system 136b are mounted with a fourth transceiver housing 140b.

The first and third transceiver housings 138a and 138b are so mounted on the bridges 22a and 22b, respectively, that the transceivers therewithin transmit ultrasonic signals in a forward direction. The second and fourth transceiver housings 140a and 140b are mounted on the control panel housings 32a and 32b, respectively, to direct ultrasonic signals emanating therefrom in a reverse direction. The forward and reverse directions are indicated by an arrow A in FIG. 8.

Figure 10:
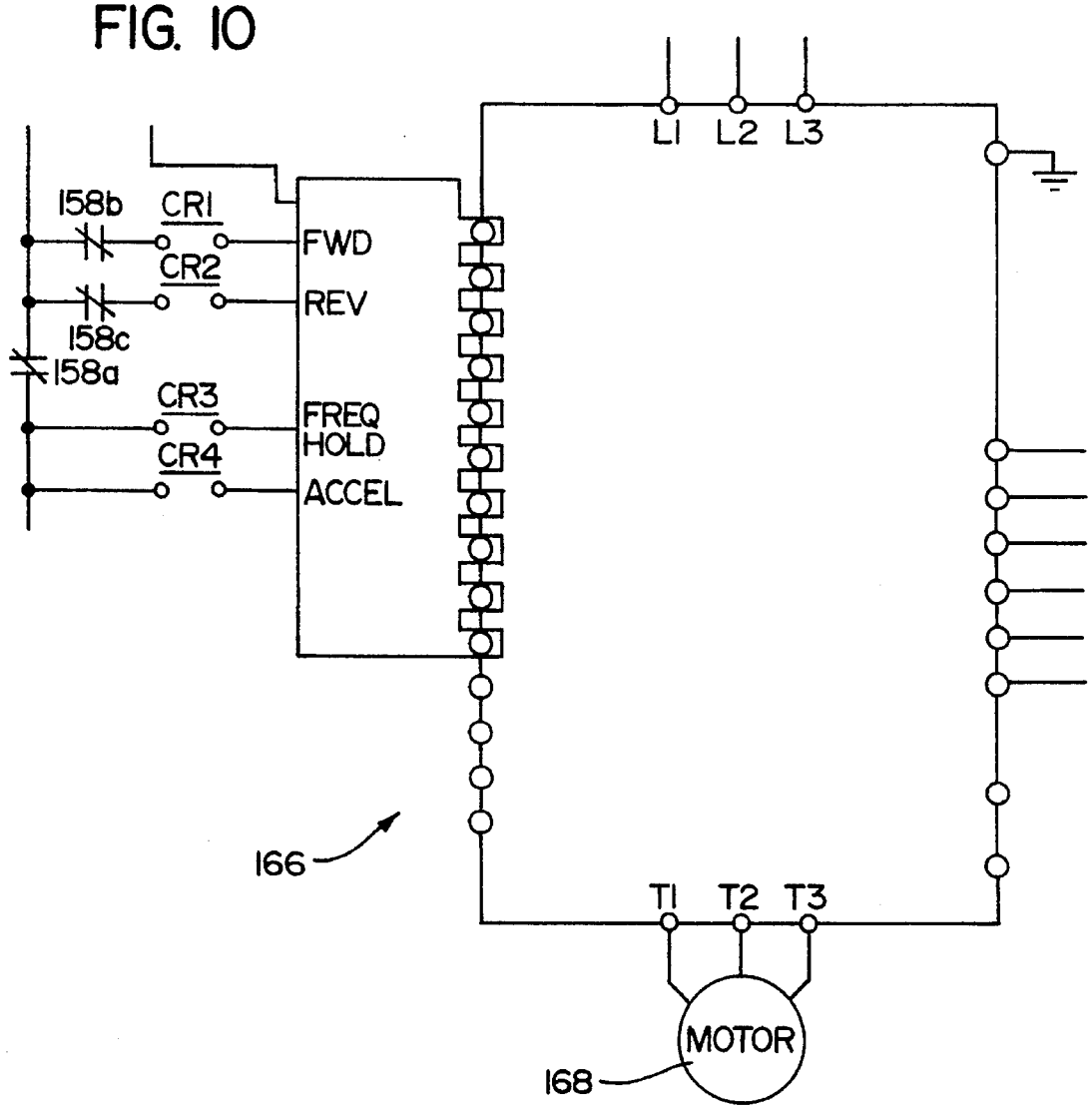
FIG. 10 depicts an exemplary control panel for an end truck drive motor and one configuration of switch logic therefor as used in the system shown in FIG. 8.

Referring back to FIG. 9, it can be seen that the dual direction control circuit 136 comprises: (a) a clock circuit 142; (b) a clock switch 144; (c) a forward direction sensor 146; (d) a transceiver selection switch 148; (e) a timing circuit 150; (f) a DAC circuit 152; (g) first through third relay drive circuits 154a–c; (h) first through third relays R1–R3 having normally closed contacts 156a–c (FIG. 10); (i) first and second relay switches 158 and 160; and (j) an inverter 162.

The dual direction control circuit 136 operates under the same basic principles as the control circuit 56 discussed above. This circuit 136 contains components which allow it to monitor two the XMTD and RECD signals generated by two transceivers and drive circuits therefor.

Specifically, the forward direction sensor 148 generates a transceiver selection switch control signal that is HIGH when the crane on which the circuit 136 is mounted is moving forward and LOW when the crane on which the circuit 136 is mounted is moving in reverse. When the transceiver selection switch control signal is HIGH, the transceiver selection switch 148 passes the XMTD1 and RECD1 signals generated by the first transceiver drive circuit 132 as the XMTD and RECD signals to the timing circuit 152. On the other hand, when the transceiver selection switch control signal is LOW, the transceiver selection switch 148 passes the XMTD2 and RECD2 signals as the XMTD and RECD signals to the timing circuit 152.

The timing circuit 152 and DAC circuit 154 operate exactly the same as the timing circuit 62 and DAC circuit 64 described above. The relay driver circuits 156a–c are constructed and are adjustable in the same manner as the relay drive circuits 66a–e described above. However, in this case, the first relay switch 160 is set to prevent the relay drive circuit 156b from operating the relay R2 when a relay switch #2 control signal (which is the same as the transceiver selection switch control signal) is LOW, indicating that the crane is operating in reverse. Similarly, the second relay switch 160 is set to prevent the relay drive circuit 156c from operating the relay R3 when a relay switch #3 control signal, which is the relay switch #2 control signal passed through the inverter 164, is LOW, indicating that the crane is moving forward.

Before discussing the operation of the control circuit 136 any further, it is necessary to discuss briefly the operation of the control panels within the control panel housings 32a and 32b. Referring now to FIG. 10, a control panel representative of the panels within the housings 32a and 32b is depicted at 166 therein. This control panel 166 is configured to allow line voltages L1, L2, and L3 to reach end truck motors represented by a motor 168 to move the crane in the direction and at speeds dictated by operator control signals generated by a pendant control such as the pendant control 44 described above.

In this configuration, the pendant control generates FORWARD, REVERSE, ACCELERATE, and FREQ HOLD control signals which close relays CR1–4, respectively, when present. Closure of either of the CR1 and CR2 relays determines the direction of the crane and causes the crane to move at a minimum speed. Closure of the relay CR3 causes the speed of the crane to remain constant, while closure of the relay CR4 causes the speed of the crane to increase. When either of the relays CR1 and CR2 are closed and neither the neither the relays CR3 nor CR4 are closed, the crane will decelerate to the minimum speed. When neither the relay CR1 nor the CR2 relays are closed, the crane will stop.

The contacts 158a, 158b, and 158c of the relays R1, R2, and R3 are also shown in FIG. 10. The contact 158a is normally closed and is so arranged that when it opens, the crane decelerates regardless of the status of the relays CR3 and CR4. The contacts 158b and 158c of the relays R2 and R3 are arranged to prevent forward and reverse movement, respectively, of the crane regardless of the status of the relays CR1 and CR2.

In this configuration, the relay R1 could be adjusted so that it opens when the crane is 15' from an object in the direction (either forward or reverse) in which the crane is moving. The relays R2 and R3 could be adjusted so that their contacts 158b and 158c open when the crane is 5' from an object in the direction, forward or reverse, respectively, in which the crane is moving.

One other point of interest is that the clock signal CLK sent to the first and second transceiver drive circuits 132 and 134 can either be internally generated by the clock circuit 144 or externally generated. The clock switch 146 determines whether an internal or an external clock is employed to trigger the transceiver drive circuits 132 and 134.

Referring back again to FIG. 8, an example of the configuration and operation of the collision avoidance systems 136a and 136b will be described. Initially, it should be noted that the clock switch of the systems 136a is set to operate off of the internal clock circuit of that system, while the clock switch of the systems 136b is set to operate off of the inverted CLK signal of the systems 136a as an external clock. This is is one way of preventing the ultrasonic signals generated by the transceivers mounted in the housings 140a and 138b, which face each other, from interfering with each other.

If the first crane 20a is moving towards the wall 46, the analog ranging signal of the collision avoidance system 136a will be generated based on a first ultrasonic signal generated by the transceiver within the housing 138a. The first relay switch of the system 136a will be closed and the second relay switch of that system will be open. Thus, when the crane 20a moves to within 15' of the wall 46, the contact 158a of the system 138a will open and cause the crane 20a to decelerate to the minimum speed. If the crane 20a moves to a distance of 5' from the wall 46, the contact 158b of the system 138a will open and prevent the crane 20a from moving further in the forward direction.

The crane 20a can be moved at any speed in the reverse direction, however, merely by operating the pendant control of the crane 20a to close the relay CR2 thereof. This is because closure of the relay CR2 causes the crane 20a to move at the minimum speed in the reverse direction and causes the ultrasonic ranging signal of the first crane 20 to be generated from a second ultrasonic signal emanating from the second housing 140a. Assuming that the crane 20a is more than 15' from the second crane 20b, the contact 158a will close when the direction of the crane 20a is reversed, enabling the operation of the relays CR3 and CR4 to increase the speed of the crane 20a.

Now, if the first and second cranes 20a and 20b are being independently operated towards each other (i.e., crane 20a moving in reverse and crane 20b moving forward), the analog ranging signal of the first crane 20a will be generated based on the second ultrasonic signal emanating from the second housing 140a, while the analog ranging signal of the second crane 20b will be generated based on a third ultrasonic signal emanating from the third housing 138b. Because the second and third ultrasonic signals are generated during opposite half-cycles of the CLK signal of the first crane 20a, the second and third ultrasonic signals do not interfere with each other.

When the cranes 20a and 20b come within 15' of each other, the contacts 158a associated with the first relays R1 in each of these cranes open, and the cranes 20a and 20b both begin to decelerate. Then, when the cranes 20a and 20b are 5' apart, the contact 158c of the relay R3 in the first crane 20a opens and the contact 158b of the relay R2 in the second crane 20b opens. This prevents the first crane 20a from moving in reverse and the second crane 20b from moving forward and thus prevents the cranes 20a and 20b from coming closer than 5' from each other. The cranes 20a and 20b can move away from each other, however.

Should both cranes 20a and 20b be moving forward, the collision avoidance system 136a on the first crane 20a will prevent the first crane 20a from colliding with the wall 46, while the collision avoidance system 136b on the second crane 20b will prevent the second crane from colliding with the first crane 20a should the first crane 20a be moving slower than the second crane 20b.

An advantage of the collision avoidance system 126 is that it requires only one control board 136 to drive two transceivers and drive circuits therefor.

Another exemplary installation of the collision avoidance system 50 described above is depicted at 170 in FIG. 11. This installation 170 is similar to that depicted in FIG. 4 in that it comprises a control panel 172 that is configured to allow line voltages L1, L2, and L3 to reach end truck motors represented by a motor 174 to move the crane in the direction and at speeds dictated by operator control signals generated by a pendant control such as the pendant control 44 described above.

Figure 11:
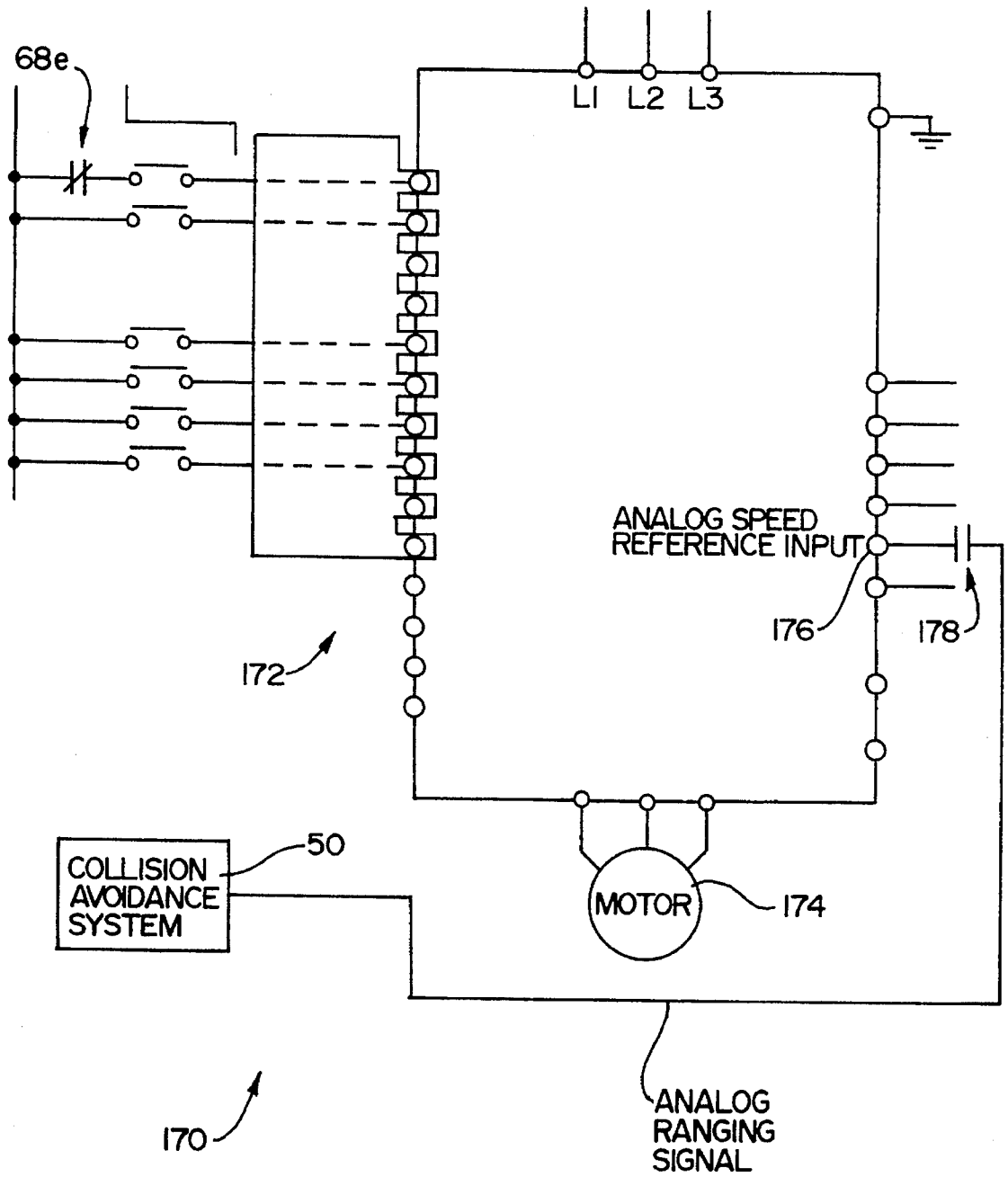
FIG. 11 depicts another exemplary control panel for an end truck drive motor and one configuration of switch logic therefor for use with the system depicted in FIG. 2.

However, the control panel 172 of the installation 170 is configured in a manner different from that of the control panel 72 described above. Specifically, the control panel 172, while configured for cumulative contact control as was the control panel 72, is further configured to receive an analog speed reference input at a terminal 176. As shown in FIG. 11, the analog ranging signal is applied to the terminal 176 of the control panel 172. This causes the speed of the motor 174 controlled by the panel 172 is limited to the maximum value determined by the analog ranging signal; as the analog ranging signal increases, the maximum speed of the motor 174 is reduced. Because the level of the analog ranging signal increases as distance between the crane and the object in its path decreases, the maximum speed of the crane decreases as the distance between the crane and the object decreases.

In this configuration 170, not all of the relays R1–R5 are necessary and thus only relays R1 and R5, adjusted as described above, are used. A normally open contact 178 of the relay R1 is so arranged that, when the crane comes within 35' of the wall, energization of relay R1 causes the contact 178 to close and thus apply the analog ranging signal to the terminal 176.

Between 35' and 5', the upper speed of the motor 174 is limited by the increasing analog ranging signal until, at 5', the normally open contact 68e of the relay R5 opens and thus prevents further forward motion of the crane.

Figure 12:
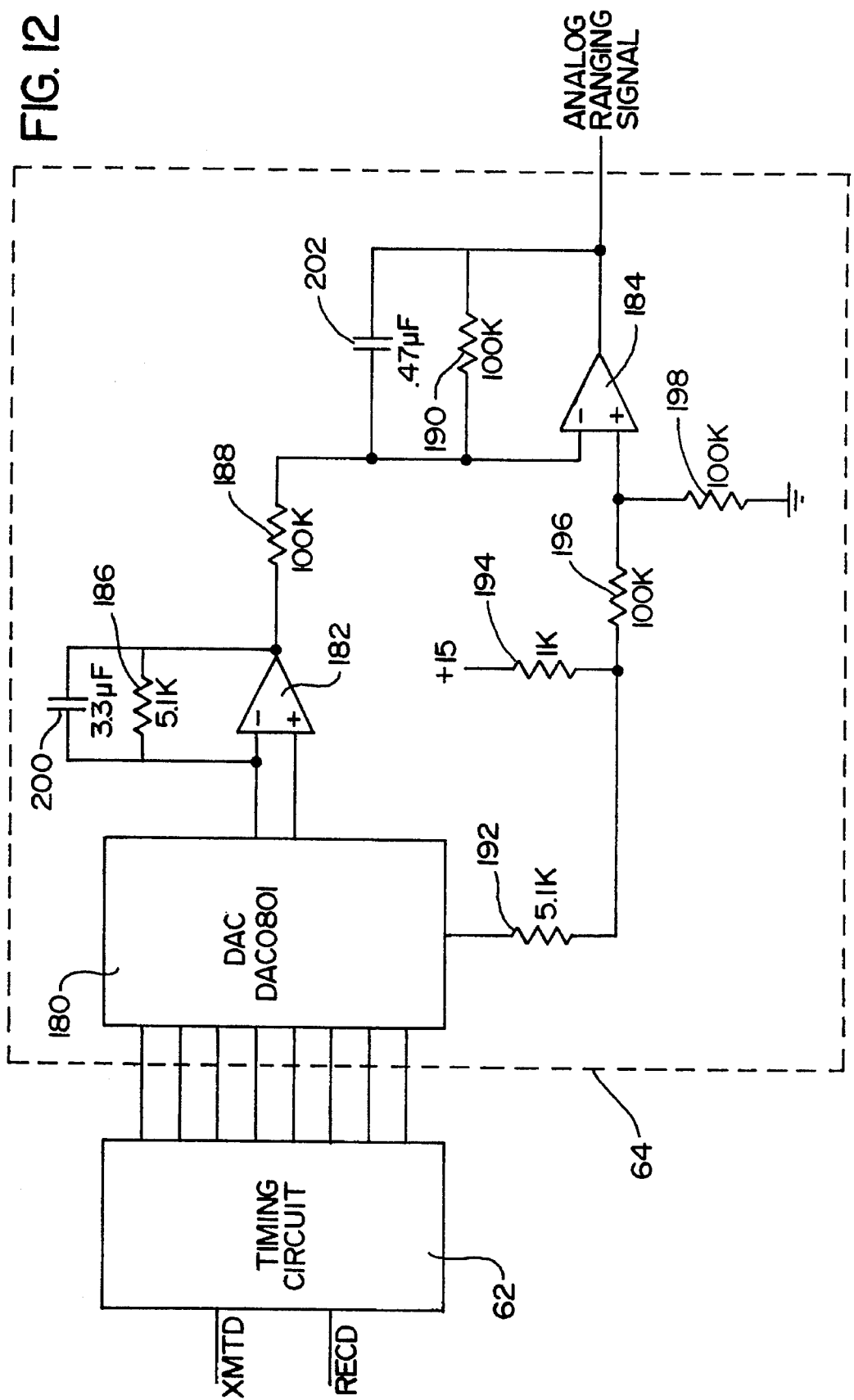
FIG. 12 depicts a digital to analog converter (DAC) circuit for use in the collision avoidance systems shown in FIGS. 3 and 9.

Referring now to FIG. 12, the construction and operation of the DAC circuit 64 will be described in further detail. The DAC circuit 64 comprises a DAC 180, first and second differential amplifiers 182 and 184, first through seventh resistors 186–198, and first and second capacitors 200 and 202.

The DAC 180 is an eight-bit digital to analog converter that receives its eight inputs from the timing circuit 62. The output of the DAC 180 (terminals 2 and 4) is amplified by the first differential amplifier 182, which is configured as a unity gain amplifier. The output of the first amplifier 182 is inverted by the second differential amplifier 184 to obtain the analog ranging signal as described above.

Importantly, the values of the first resistor 186, the first capacitor 100, the third resistor 190, and the second capacitor 202 are chosen to reduce the likelihood that collision avoidance system will not falsely react to transients such as insects by slowing down the output of the DAC 180. Specifically, for a first resistor 186 having a value of 5.1KΩ, the first capacitor 200 should have a value between 3.3 and 6.8 μF, and, for a third resistor 190 having a value of 100KΩ, the second capacitor 202 should have a value between 0.47 and 0.75 μF. Stated another way, the slew rate of the combination of the first resistor 186 and the first capacitor 200 should be between 0.5 and 0.75 seconds, while the slew rate of the combination of the third resistor 190 and the third capacitor 202 should be within 0.75 and 1.3 seconds. In the exemplary DAC circuit 64 described above, the values of the first and second capacitors are 3.3 μF and 0.47 μF, respectively.

Figure 13:
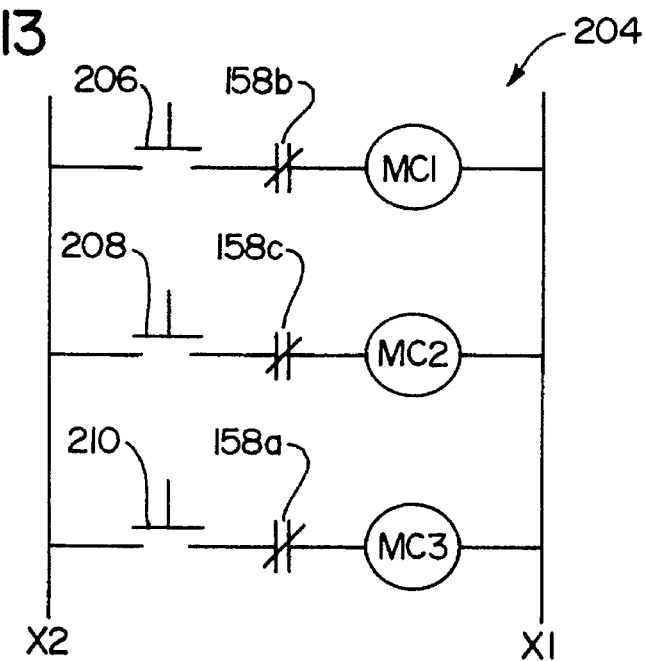
FIG. 13 schematically depicts another exemplary arrangement of the collision avoidance system depicted in FIG. 9.
Figure 14:
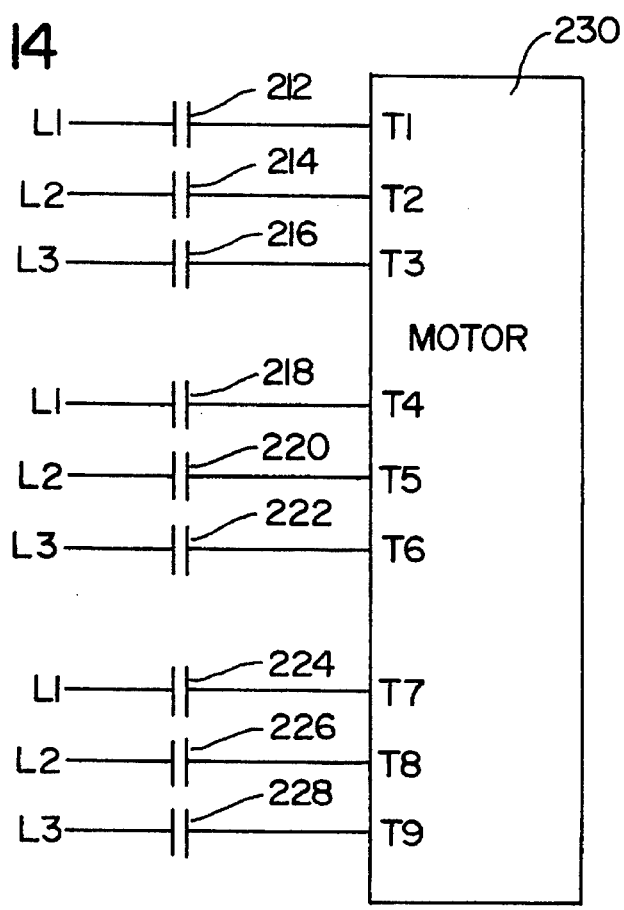
FIG. 14 depicts the motor and controls therefor used in the arrangement depicted in FIG. 13.

Another exemplary arrangement of the collision avoidance system 126 described above (FIG. 9) is depicted at 204 in FIGS. 13. The contacts 158a, 158b, and 158c associated with the relays R1, R2, and R3 are shown in FIG. 13. These contacts 158a–c are normally closed and arranged between push buttons 206, 208, and 210 and motor control relays MC1, MC2, and MC3, respectively. The motor control relays MC1, MC2, and MC3, when energized, close normally open contacts 212–216, 218–222, and 224–228, respectively (FIG. 14). When motor control relays MC1, MC2, and MC3 are energized by pressing the buttons 206, 208, and 210, the line power reaches terminals T1–T3, T4–T6, T7–T9 of a crane motor 230. Button 206 causes the crane to move forward at low speed, button 208 causes the crane to move in reverse at low speed, and button 210 is pressed at the same time as one of the buttons 206 and 208 to cause the crane to move at high speed.

Referring now to the relay drive circuits 156a–c (FIG. 9) associated with the relays R1, R2, and R3: (a) the circuit 156a is so adjusted that the relay R1 is energized when the crane is within 15' of an object in its path in the direction of travel; (b) the circuit 156b is so adjusted that the relay R2 is energized when the crane is within 5' of an object in its path in the forward direction; and (c) the circuit 156c is so adjusted that the relay R3 is energized when the crane is within 5' of an object in its path in the reverse direction. Further, when relays R1, R2, and R3 are energized, the contacts 68a–c open to prevent the motor control relays MC1, MC2, and MC3, respectively, from being energized regardless of the state of the buttons 206, 208, and 210. So arranged, the system 126 reduces the likelihood that the crane will contact an object in its path.

It should be clear from the foregoing that the present invention may be embodied in many forms other than those described above. For example, the principles of the arrangement 170 just-described could easily be applied to a dual direction system such as the system 126 described above. Further, while we have described two basic configurations of control panels, it is clear that a great variety of control panel configurations may be controlled using the basic principles of the present invention with appropriate selection of distances, adjustment of relay drive circuits, arrangement of relay contacts, and application of the analog ranging signal.

The above description is therefore to be considered in all respects illustrative and not restrictive, the scope of the invention being indicated by the appended claims rather than the foregoing description. All changes that come within the meaning and scope of the claims are intended to be embraced therein.

I claim:

1. An apparatus for controlling an overhead crane in a manner that reduces the likelihood that the crane and objects suspended therefrom will contact another object, comprising:
    a. control means for controlling the speed and direction of the crane based on a plurality of operator control signals; and
    b. a collision avoidance system comprising
        i. an ultrasonic transceiver for generating an ultrasonic signal and receiving a reflected ultrasonic signal that has been reflected off of the other object, the reflected ultrasonic signal being indicative of a distance between the crane and the other object,
        iii. means for generating an analog ranging signal based on the reflected ultrasonic signal, the level of the ranging signal being substantially proportional to the distance between the crane and the other object,
        iii. a plurality of relays, and
        iv. relay driver means associated with each of the relays for operating the relay associated therewith, the relay driver means being operator adjustable to allow the relays associated therewith to be operated based on a desired level of the ranging signal; wherein the relays are so arranged and the relay driver means are so adjusted that, when the crane is likely to contact the other object, the relay driver means so operates the relays that the relays cause the control means initially to limit the speed of the crane and then to stop the crane; and the control means controls the crane to travel in a first direction when a first operator control signal is present, to travel in a second direction when a second operator control signal is present, and to accelerate when a third operator control signal is present, to maintain a constant speed when a fourth operator control signal is present, to decelerate when neither the third nor the fourth operator control signal is present, and to stop when neither the first nor the second operator control signals are present, where (i) a first relay of the plurality of relays is so arranged that, when operated, it prevents the third and fourth operating signals from being present and (ii) a second relay of the plurality of relays is arranged so that, when operated, it prevents at least the first and second operating signals from being present.

2. An apparatus as recited in claim 1, in which the control means and the collision avoidance system obtain power from a common power source, wherein:
    a. the apparatus comprises means for feeding power from the power source through the collision avoidance system to the control means; and
    b. the collision avoidance system further comprising means for disrupting power to the control means when a fault occurs in the collision avoidance system.

3. An apparatus as recited in claim 2, in which the means for disrupting power to the control means comprises:
    a. means for interrupting power to the collision avoidance system when a fault occurs therein;
    b. a lock-out relay for preventing power from reaching the control means when power to the avoidance system is interrupted; and
    c. means for allowing the operator to bypass the lock-out relay to operate the control means when power to the collision avoidance system is interrupted.

4. An apparatus as recited in claim 1, in which each relay driver means operates its associated relay by energizing the relay so that the relay is open within a predetermined range of ranging signals including the desired level.

5. An apparatus as recited in claim 4, in which each predetermined range has first and second ends and the desired level defines the first end of the predetermined range, where the distance between the crane and the object is greater for the first end of the predetermined range than for the second end of the predetermined range.

6. An apparatus as recited in claim 5, in which the relay driver means comprise:
    a. first comparator means having a first input connected to a first reference signal and a second input connected to the ranging signal,
    b. means for allowing an operator to set the first reference signal;
    c. second comparator means having a first input connected to the ranging signal and a second input connected to a second reference signal, the second reference signal having a predetermined relationship to the first reference signal; wherein the first and second reference signals correspond to the first and second ends of the predetermined range, respectively; and the first and second comparators generate output signals which cause the associated relay to be energized and deenergized as appropriate to open the relay within the predetermined range.

7. An apparatus as recited in claim 6, in which the relay driver means further comprise means for so energizing the associated relay that the relay opens when the output of the first comparator indicates that the ranging signal enters the predetermined range and closes the relay when the output of the second comparator indicates that the ranging signal has left the predetermined range.

8. An apparatus for controlling an overhead crane in a manner that reduces the likelihood that the crane and objects suspended therefrom will contact another object, comprising:

a. control means for controlling the speed and direction of the crane based on a plurality of operator control signals; and b. a collision avoidance system comprising i. an ultrasonic transceiver for generating an ultrasonic signal and receiving a reflected ultrasonic signal that has been reflected off of the other object, the reflected ultrasonic signal being indicative of a distance between the crane and the other object, iii. means for generating an analog ranging signal based on the reflected ultrasonic signal, the level of the ranging signal being substantially proportional to the distance between the crane and the other object, iii. a plurality of relays, and iv. relay driver means associated with each of the relays for operating the relay associated therewith, the relay driver means being operator adjustable to allow the relays associated therewith to be operated based on a desired level of the ranging signal; wherein the relays are so arranged and the relay driver means are so adjusted that, when the crane is likely to contact the other object, the relay driver means so operates the relays that the relays cause the control means initially to limit the speed of the crane and then to stop the crane; and the control means controls the crane to travel in a first direction when a first operator control signal is present, to travel in a second direction when a second operator control signal is present, to stop when neither the first nor the second operator control signals are present, and to limit a maximum speed of the crane according to an analog input signal, where (i) a first relay of the plurality of relays is so arranged that, when operated, it allows the analog ranging signal to be input to the control means as the analog input signal to limit the maximum speed of the crane in a manner that reduces the maximum speed of the crane as it approaches objects in its direction of travel and (ii) a second relay of the plurality of relays is arranged so that, when operated, it prevents the first and second operating signals from being present.

9. A method of controlling an overhead crane in a manner that reduces the likelihood that the crane will contact another object, comprising the steps of:

a. providing a control means for controlling the speed and direction of the crane based on a plurality of operator control signals;

b. arranging an ultrasonic transceiver on the crane such that the transceiver i. transmits an ultrasonic signal that impinges upon objects in the direction of travel of the crane, and ii. receives a reflected ultrasonic signal that has been reflected off of objects in the direction of travel of the crane, the reflected ultrasonic signal being indicative of a distance between the crane and such objects;

d. generating an analog ranging signal based on the reflected ultrasonic signal, the level of the ranging signal being substantially proportional to the distance between the crane and the other object;

e. providing a plurality of relay drivers, where each relay operates a relay associated therewith, the relay drivers being operator adjustable to allow the relays associated therewith to be operated based on a desired level of the ranging signal;

f. determining a first distance between the crane and objects in the direction of travel thereof, where the crane should operate at reduced speeds when the crane is within the first distance away from objects in the direction of travel thereof;

g. determining a final distance between the crane and objects in the direction of travel thereof, where the crane should not move when the crane is within the final distance away from objects in the direction of travel thereof;

h. placing an object in the direction of travel of the crane the first distance away from the crane;

i. adjusting a first of the relay drivers until it operates its associated, first, relay;

j. placing the object in the direction of travel of the crane the final distance away from the crane;

k. adjusting a second of the relay drivers until it operates its associated, second, relay;

l. so arranging the first relay that operation thereof directs the control means to limit the speed of the crane to a low range of speeds; and m. so arranging the second relay so that operation thereof directs the control means to stop the crane;

n. where the control means controls the crane to travel in a first direction when a first operator control signal is present, to travel in a second direction when a second operator control signal is present, to accelerate when a third operator control signal is present, to maintain a constant speed when a fourth operator control signal is present, to decelerate when neither the third nor the fourth operator control signals are present, and to stop when neither the first nor the second operator control signals are present, the method further comprising the steps of o. so arranging the first relay that, when operated, it prevents the third and fourth operator control signal from being present; and p. so arranging the second relay that, when operated, it prevents at least the first and second operator control signals from being present.

10. A method of controlling an overhead crane in a manner that reduces the likelihood that the crane will contact another object, comprising the steps of:

a. providing a control means for controlling the speed and direction of the crane based on a plurality of operator control signals;

b. arranging an ultrasonic transceiver on the crane such that the transceiver i. transmits an ultrasonic signal that impinges upon objects in the direction of travel of the crane, and ii. receives a reflected ultrasonic signal that has been reflected off of objects in the direction of travel of the crane, the reflected ultrasonic signal being indicative of a distance between the crane and such objects;

d. generating an analog ranging signal based on the reflected ultrasonic signal, the level of the ranging signal being substantially proportional to the distance between the crane and the other object;

e. providing a plurality of relay drivers, where each relay operates a relay associated therewith, the relay drivers being operator adjustable to allow the relays associated therewith to be operated based on a desired level of the ranging signal;

f. determining a first distance between the crane and objects in the direction of travel thereof, where the crane should operate at reduced speeds when the crane is within the first distance away from objects in the direction of travel thereof;

g. determining a final distance between the crane and objects in the direction of travel thereof, where the crane should not move when the crane is within the final distance away from objects in the direction of travel thereof;

h. placing an object in the direction of travel of the crane the first distance away from the crane;

i. adjusting a first of the relay drivers until it operates its associated, first, relay;

j. placing the object in the direction of travel of the crane the final distance away from the crane;

k. adjusting a second of the relay drivers until it operates its associated, second, relay;

l. so arranging the first relay that operation thereof directs the control means to limit the speed of the crane to a low range of speeds; and m. so arranging the second relay so that operation thereof directs the control means to stop the crane;

n. wherein the control means controls the crane to travel in a first direction when a first operator control signal is present, to travel in a second direction when a second operator control signal is present, to stop when neither the first nor the second operator control signals is present, and to limit the speed of the crane according to an analog input signal, the method further comprising the steps of o. so arranging the first relay that, when operated, it allows the analog ranging signal to be input to the control means as the analog input signal to limit the maximum speed of the crane in a manner that reduces the maximum speed of the crane as it approaches objects in its direction of travel; and p. so arranging the second relay that, when operated, it prevents the first and second operator control signals from being present.

11. A method as recited in claim 10, in which the step of providing the relay drivers comprises the step of providing relay operating circuits that operate their associated relays by energizing the relay so that the relay is open within a predetermined range of ranging signals including the desired level.

12. A method as recited in claim 11, in which each predetermined range has first and second ends and the desired level defines the first end of the predetermined range, where the distance between the crane and the object is greater for the first end of the predetermined range than for the second end of the predetermined range.

13. A method as recited in claim 12, in which the the step of providing relay operating circuits comprises the steps of:

a. providing first comparator means having a first input connected to a first reference signal and a second input connected to the ranging signal, b. providing means for allowing an operator to set the first reference signal;

c. providing second comparator means having a first input connected to the ranging signal and a second input connected to a second reference signal, the second reference signal having a predetermined relationship to the first reference signal; wherein the first and second reference signals correspond to the first and second ends of the predetermined range, respectively; and the first and second comparators generate output signals which cause the associated relay to be energized and deenergized as appropriate to open the relay within the predetermined range.

14. A method as recited in claim 13, in which the step of providing the relay operating circuits further comprises the step of providing means for so energizing the relay associated therewith that the associated relay opens when the output of the first comparator indicates that the ranging signal enters the predetermined range and closes the relay when the output of the second comparator indicates that the ranging signal has left the predetermined range.

15. A method of controlling an overhead crane in a manner that reduces the likelihood that the crane will contact another object, comprising the steps of:

a. providing a control means for controlling the speed and direction of the crane based on a plurality of operator control signals;

b. arranging an ultrasonic transceiver on the crane such that the transceiver i. transmits an ultrasonic signal that impinges upon objects in the direction of travel of the crane, and ii. receives a reflected ultrasonic signal that has been reflected off of objects in the direction of travel of the crane, the reflected ultrasonic signal being indicative of a distance between the crane and such objects;

d. generating an analog ranging signal based on the reflected ultrasonic signal, the level of the ranging signal being substantially proportional to the distance between the crane and the other object;

e. providing a plurality of relay drivers, where each relay operates a relay associated therewith, the relay drivers being operator adjustable to allow the relays associated therewith to be operated based on a desired level of the ranging signal;

f. determining a first distance between the crane and objects in the direction of travel thereof, where the crane should operate at reduced speeds when the crane is within the first distance away from objects in the direction of travel thereof;

g. determining a final distance between the crane and objects in the direction of travel thereof, where the crane should not move when the crane is within the final distance away from objects in the direction of travel thereof;

h. placing an object in the direction of travel of the crane the first distance away from the crane;

i. adjusting a first of the relay drivers until it operates its associated, first, relay;

j. placing the object in the direction of travel of the crane the final distance away from the crane;

k. adjusting a second of the relay drivers until it operates its associated, second, relay;

l. so arranging the first relay that operation thereof directs the control means to limit the speed of the crane to a low range of speeds; and m. so arranging the second relay so that operation thereof directs the control means to stop the crane;

n. where the control means controls the crane to travel in a first direction when a first operator control signal is present, to travel in a second direction when a second operator control signal is present, to travel at the slow speed when a third operator control signal is present, to travel at a second speed when a fourth operator control signal is present, and to stop when neither the first nor the second operator control signals are present, the method further comprising the steps of o. so arranging the first relay that, when operated, it prevents the fourth operator control signal from being present; and p. so arranging the second relay that, when operated, it prevents at least the first and second operator control signals from being present.

* * * * *